J. V. RAYMOND.
Registering-Thermometers.

No. 157,633. Patented Dec. 8, 1874.

Witnesses:
Ernst Bilhuber
Henry G. Gutmer

Inventor
John V. Raymond
pr
Van Santvoord & Hauff
Attys

UNITED STATES PATENT OFFICE.

JOHN V. RAYMOND, OF WEST HOBOKEN, NEW JERSEY.

IMPROVEMENT IN REGISTERING-THERMOMETERS.

Specification forming part of Letters Patent No. 157,633, dated December 8, 1874; application filed November 6, 1874.

*To all whom it may concern:*

Be it known that I, JOHN V. RAYMOND, of West Hoboken, in the county of Hudson and State of New Jersey, have invented a certain new and Improved Self-Registering Thermometer, of which the following is a specification:

This invention is illustrated in the accompanying drawing, in which—

Figure 1:
Figure 2:
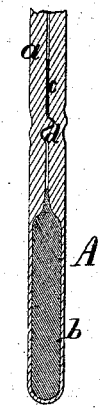

Figure 1 represents a side view. Fig. 2 is a longitudinal vertical section in a larger scale than the previous figure.

The remaining figures are modifications.

Similar letters indicate corresponding parts.

This invention relates to an improvement on that class of thermometers in which a small quantity of mercury or other liquid is separated from the main body by a little air-bubble, so as to form an index which rises as the main body of the mercury expands, but which remains stationary in the tube when the main body of the mercury sinks down, and which can only be returned to its starting-point by shaking or swinging the tube in the proper manner. If the shaking or swinging is too violent, the index is liable to displace the separating air-bubble, and to combine with the main body of the mercury, and the thermometer is spoiled.

My invention consists in the arrangement of a contraction in the tube of the thermometer, between the index and the bulb containing the main body of the mercury or other liquid, said contraction being produced by twisting the tube in such a manner that, when the thermometer is swung or shaken for the purpose of returning the index to its starting-point, said contraction prevents the index from combining with the main body of the mercury, and the thermometer is not liable to get out of order.

In the drawing, the letter A designates a thermometer, which is made of glass, the scale being marked on the outside of the tube *a*. This tube extends from the bulb *b*, which contains the main body of the mercury or other indicating liquid, and in the tube is contained a small quantity of mercury or other liquid, which forms the index *c*, and which is separated from the main body of mercury by a small air-bubble.

Figure 3:
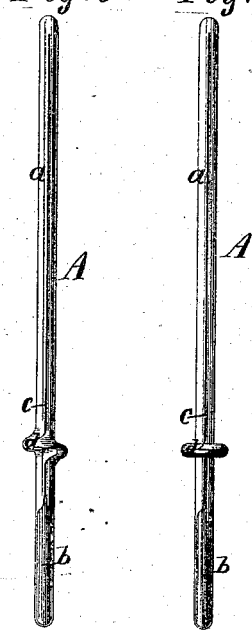
Figure 4:

In the tube *a* I produce a contraction, *d*, by twisting the tube, either as shown in Fig. 1, or as shown in Figs. 3 and 4, the index *c* being contained in that portion of the tube above said twist, which is of such a nature that it reduces the transverse section of the bore of the tube without closing the same entirely.

When the bulb *b* is exposed to heat—for instance, by placing the same into the hands of a person afflicted with fever—the mercury expands and rises in the tube, passing through the contraction *d*, and forcing up the index *c* to a point corresponding to the temperature of the hand of the patient. By taking the thermometer away from the patient and allowing it to stand exposed to the temperature of the atmosphere, the main body of the mercury sinks down beneath the contraction *d*, while the index remains stationary at the point to which it has been raised, and thus the temperature of the hand of the patient can be observed with accuracy.

Before a fresh observation can be taken, the index must be returned to its starting-point, which is effected by taking hold of the upper end of the tube and swinging the same rapidly and repeatedly until the index recedes.

By the contraction *d* the index is prevented from receding beyond the desired point, and the thermometer is not liable to get out of working order, whereas in thermometers of the same class, when made without the contraction *d*, the index, when caused to recede by shaking or swinging the tube, is liable to displace the separating air-bubble, and to join the main body of the mercury, whereby the thermometer is rendered inoperative.

What I claim as new, and desire to secure by Letters Patent, is—

A thermometer having an index of mercury separated from the main body by an air-bubble, and provided with a contracted twist, constructed in the tube between its bulb and the said index of mercury, for preventing the latter combining with the main body of mercury, as and for the purpose described.

In testimony that I claim the foregoing I have hereunto set my hand this 31st day of October, 1874.

JOHN V. RAYMOND.

Witnesses:
E. F. KASTENHUBER,
GEO. H. CHINNOCK.